(12) United States Patent
Perrin

(10) Patent No.: US 6,286,847 B1
(45) Date of Patent: Sep. 11, 2001

(54) BICYCLE COUPLING DEVICE

(76) Inventor: Henri Perrin, 615, rang Saint-Pierre Sud, Saint-Constant, Québec (CA), J5A 2E7

( * ) Notice: Subject to any disclaimer, the term of this patent is extended or adjusted under 35 U.S.C. 154(b) by 0 days.

(21) Appl. No.: 09/263,859

(22) Filed: Mar. 8, 1999

(30) Foreign Application Priority Data

Mar. 3, 1998 (GB) .................................................. 9804326

(51) Int. Cl.$^7$ ................................................. B62K 27/00
(52) U.S. Cl. ........................................... 280/204; 280/292
(58) Field of Search .................................. 280/202, 203, 280/204, 281.1, 231, 273, 292, 492, 493, 7.16, 494

(56) References Cited

U.S. PATENT DOCUMENTS

| | | | | |
|---|---|---|---|---|
| 4,261,592 | * | 4/1981 | Busseuil | 280/292 |
| 4,307,893 | * | 12/1981 | Ragland | 280/204 |
| 4,729,576 | * | 3/1988 | Roach | 280/493 |

FOREIGN PATENT DOCUMENTS

2264424 * 9/1999 (CA) .

* cited by examiner

*Primary Examiner*—Christopher P. Schwartz
*Assistant Examiner*—C. T. Bartz
(74) *Attorney, Agent, or Firm*—Holland & Knight LLP

(57) ABSTRACT

A coupling device for coupling a leading bicycle to a trailing bicycle which includes an elongated assembly having a first connecting device located at one end of the elongated assembly for connecting to the shaft of a handle bar of the trailing bicycle, a second connecting device located at an opposite end for connection to a leading bicycle about a seat post thereof, and an interconnecting portion extending between the first connecting device and second connecting device, the interconnecting portion having a rigid segment and a flexible segment, the rigid segment having a telescopic arrangement for length adjustment, the flexible segment permitting movement in all planes including a torsional or rotational movement while being substantially inextensible in the longitudinal axis. The arrangement permits both bicycles to be ridden at the same time in a tandem type arrangement.

15 Claims, 3 Drawing Sheets

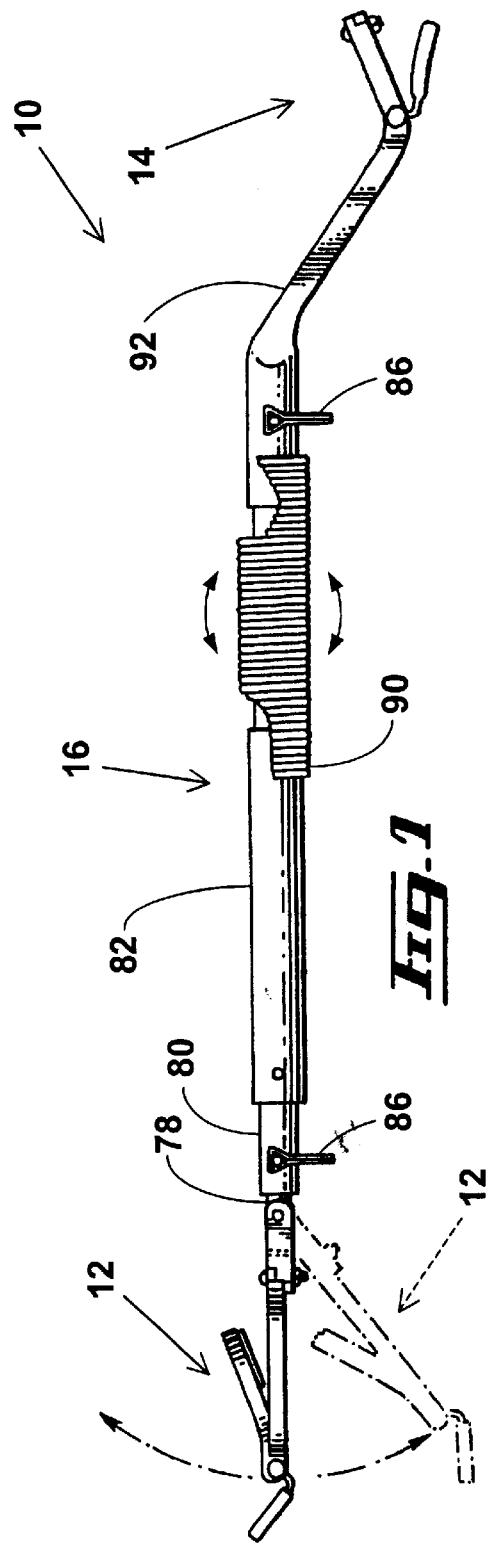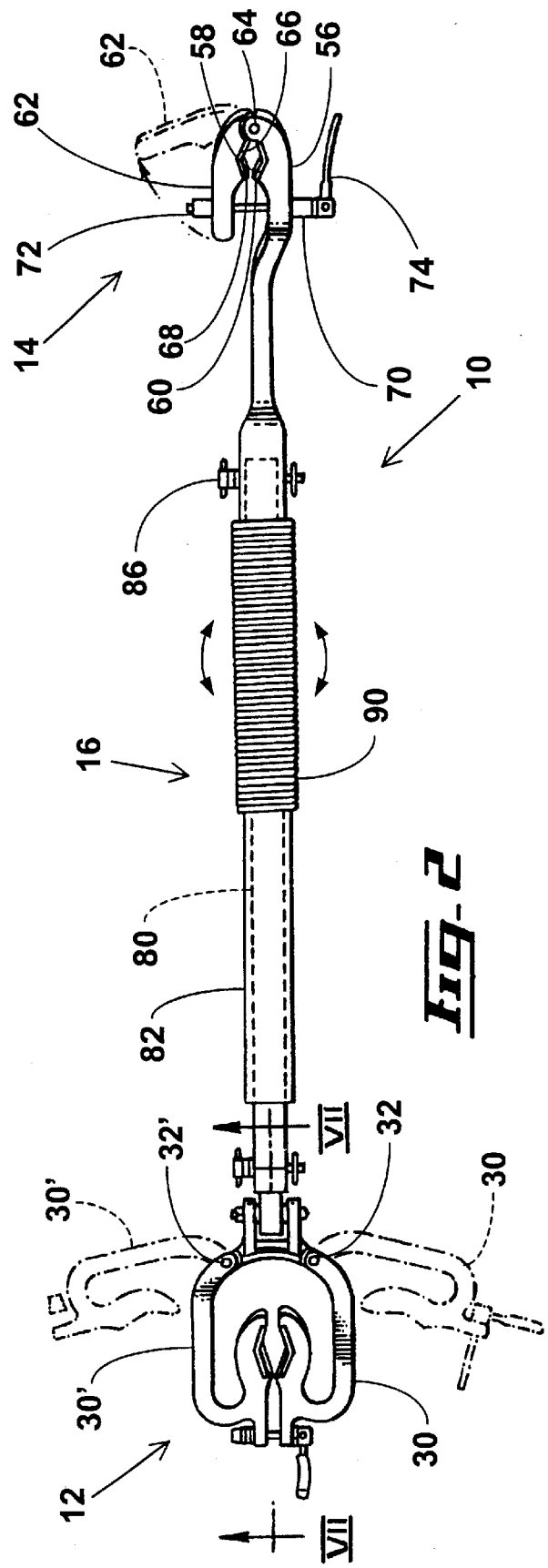

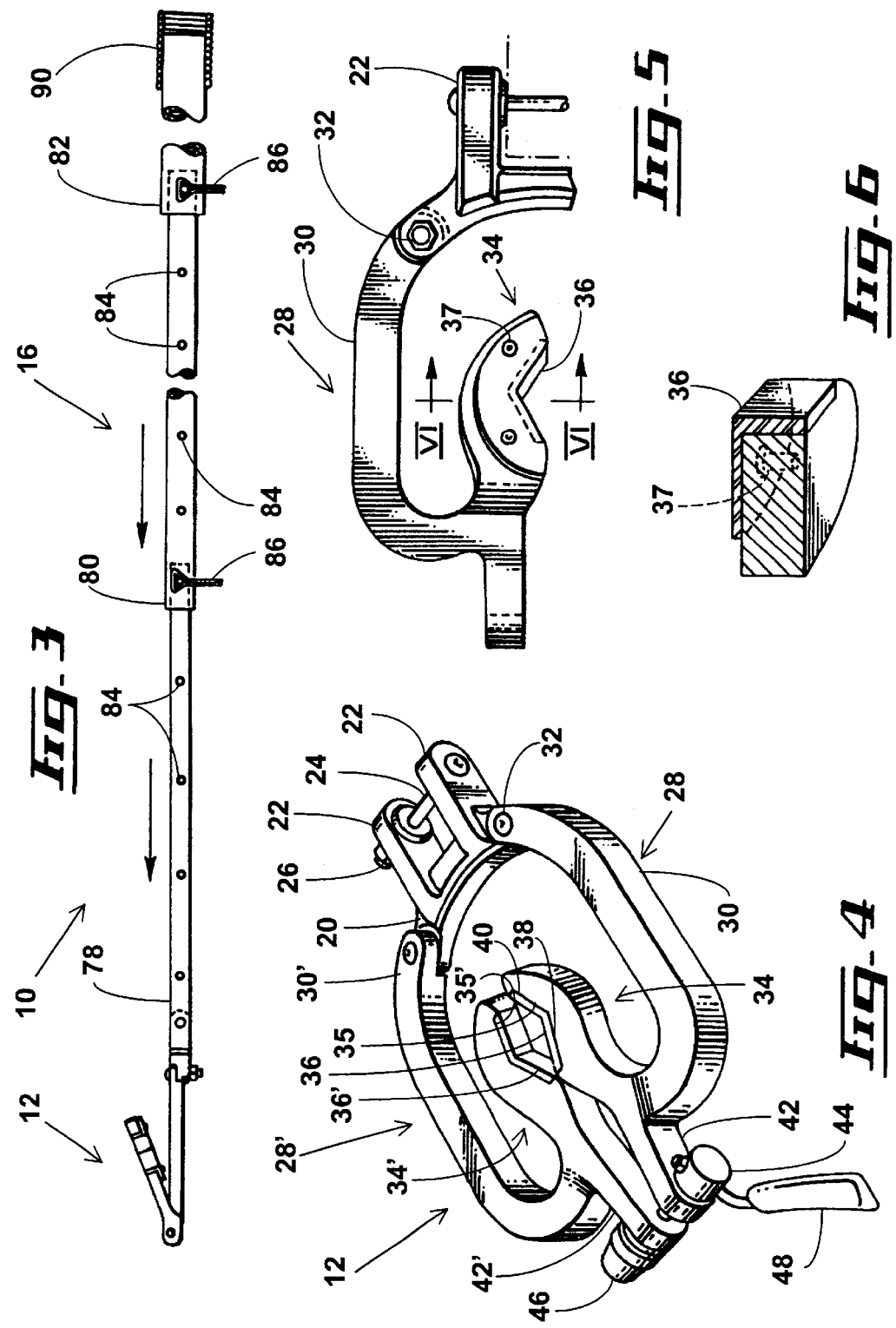

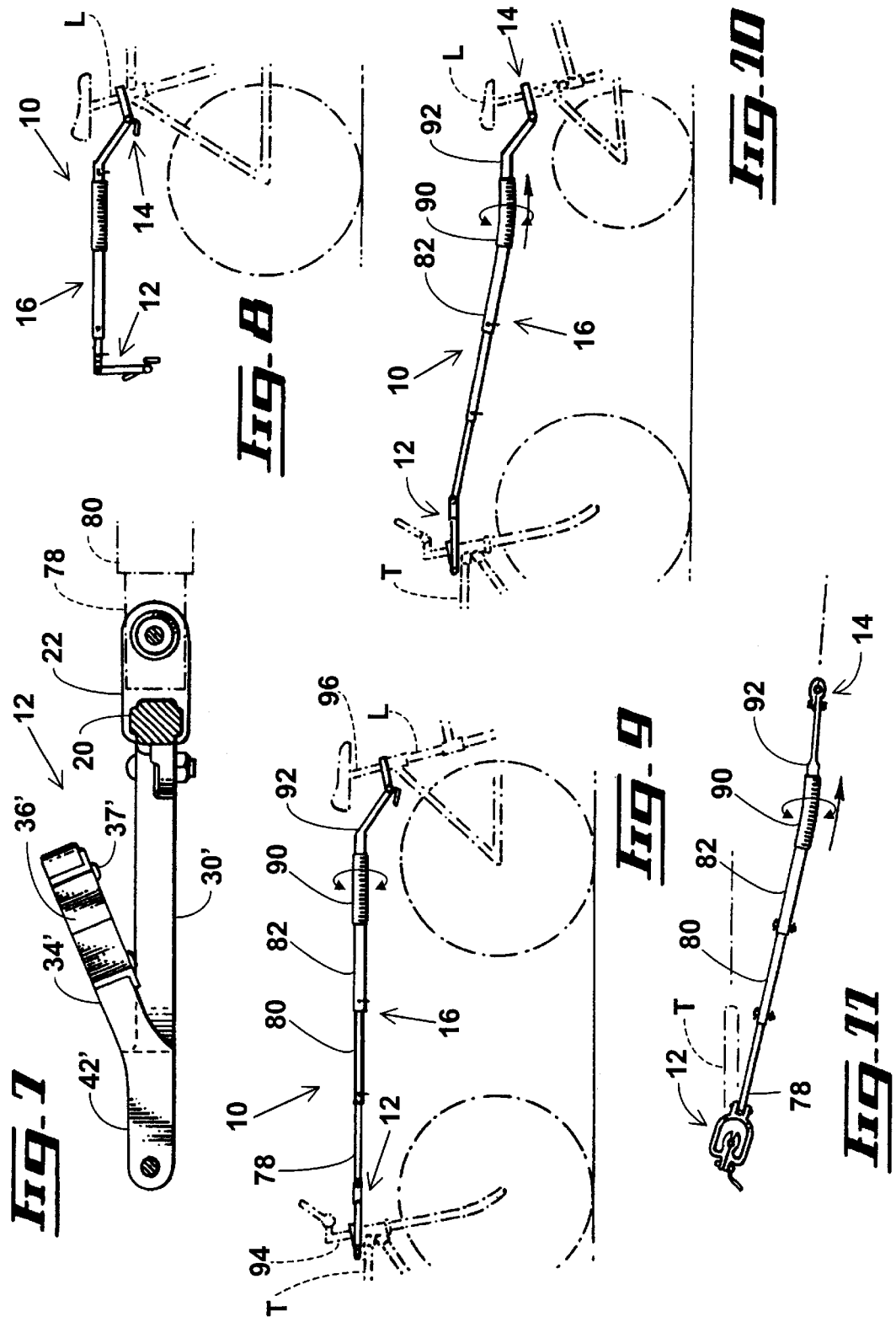

BICYCLE COUPLING DEVICE

The present invention relates to bicycle accessories and more particularly, relates to a device for coupling bicycles together so as to form a tandem bicycle arrangement.

BACKGROUND OF THE INVENTION

Tandem bicycles are well known in the art and are popular. With conventional tandem bicycles, the pedals are connected to a common drive chain for pedaling the bicycle. As such, both cyclists, when pedaling, must do so at the same rhythm.

Tandem bicycles are also relatively long and thus difficult to transport, particularly on small automobiles. On the contrary, two single bicycles can easily be stored side to side on most conventional bicycle racks which may be mounted on an automobile.

One can couple two single bicycles together to form a tandem to thus provide the advantages of a tandem bicycle. However, the coupling of the two bicycles to form the tandem bicycle is difficult to do in a manner in which a stable arrangement is reached.

The prior art does suggest that one can connect two single bicycles to provide a tandem bicycle arrangement. One such arrangement is shown in U.S. Pat. No. 4,458,908 issued in 1984 which shows two standard bicycles connected by removing the front wheel and fork of the rear bicycle and placing an adapter on the frame of the rear bicycle which is then mounted to the rear axle of the leading bicycle. The desirability of connecting two bicycles together to form a tandem bicycle is exemplified by U.S. Pat. No. 1,300,343 to Carswell which issued in 1919 and which shows another arrangement wherein a tandem bicycle arrangement is achieved. In this patent, the tines of the fork of the rear bicycle are coupled to a coupling link which is a forged tee having a ball bearing hob into which the fork connects. Still further examples of proposals in the prior art for tandem bicycle arrangements are exemplified by U.S. Pat. Nos. 4,307,893; 4,261,592; and 5,039,120.

The prior art does suffer from certain disadvantages. In some instances, the front wheel of the rear bicycle must be removed and then stored which is an inconvenience. The combination of two single bicycles does pose certain stability problems. Thus, if the area proximate the seat of the lead bicycle is connected to the portion adjacent the handle bar of the trailing bicycle by a cable type arrangement, the assembly is unstable when the cable is stretched out. However, the rear can never do more than provide is own mode of power—i.e. it can not assist in pushing the leading bicycle.

The use of a rigid bar having a universal joint or the like does not assist. If the trailing bicycle pushes in a direction other than the direction in which the bicycles are traveling, an oblique reaction force is exerted which tends to incline the bicycle toward the outside. The cyclist may attempt to correct this by turning the handle bar one way or another to provide a certain degree of stability. However, the two cyclists are generally not able to coordinate their movements.

SUMMARY OF THE INVENTION

It is therefore an object of the present invention to provide a coupling assembly for connecting two bicycles together which overcomes above disadvantages.

It is a further object of the present invention to provide a coupling assembly for a pair of bicycles wherein the assembly may be easily mounted and removed from the bicycles.

It is a further object of the present invention to provide a compact coupling assembly for connecting two bicycles which provides for adjustments for different situations and bicycle configurations.

According to one aspect of the present invention, there is provided a coupling device comprising an elongated assembly, the elongated assembly having a first connecting device located at one end of the elongated assembly for connection to a trailing bicycle; a second connecting device located at an opposite end thereof for connection to a leading bicycle; an interconnecting portion extending between the first connecting device and the second connecting device; the interconnecting portion comprising a rigid segment and a flexible segment, the flexible segment permitting movement in all planes while being substantially inextensible in the longitudinal axis; and the rigid segment being longitudinally adjustable to vary the length of the coupling device.

According to a further aspect of the present invention, there is provided a combination of a leading bicycle and a trailing bicycle and a coupling device interconnecting the leading bicycle and the trailing bicycle, the coupling device comprising an elongated assembly, the elongated assembly having a first connecting device located at one end of the elongated assembly connected to the trailing bicycle; a second connecting device located at an opposite end thereof connected to the leading bicycle; an interconnecting portion extending between the first connecting device and the second connecting device; the interconnecting portion comprising a rigid segment and a flexible segment, the flexible segment permitting movement in all planes while being substantially inextensible in the longitudinal axis; and the rigid segment being longitudinally adjustable to vary the length of the coupling device; the first connecting device extending about a downwardly extending shaft of a handle bar of the trailing bicycle, the second connecting device extending about and encircling a seat post of the leading bicycle.

In greater detail, the coupling device of the present invention permits a leading bicycle and a trailing bicycle to be attached together and wherein each bicycle may have a rider thereon.

The coupling device permits adjustability both to vary the length of the coupling device as may be required between different bicycles and also to permit the coupling together of bicycles which may be of different sizes. This is accomplished through the use of the flexible segment. The flexible segment preferably permits movement in all planes and also permits a rotational or torsional movement. At the same time, the flexible segment is preferably substantially inextensible so as to not permit movement in the longitudinal axis of the coupling device. In one embodiment, the flexible segment will be in the form of a helically wound member which is of sufficient strength to substantially prevent movement in the longitudinal axis while permitting some movement in the other planes. In this respect, it will be understood that the flexible segment may be in the form of a <<spring>>, but which spring is substantially inextensible under the forces normally encountered. Alternatively, a flexible segment of a suitable rubber or thermoplastic material could be utilized.

The connecting device for connection to the trailing bicycle preferably includes first and second jaw members which are pivotably connected to a base. The first and second jaw members would each have a gripping segment which together would define an encircling portion designed to encircle a shaft of a bicycle handle bar. The gripping segments are preferably provided with a bushing such that the gripping segments are free to rotate about the shaft—i.e. they do not firmly grip the shaft of the bicycle handle bar.

Similarly, the second connecting device is designed to encircle a seat post or related portion thereabout of the leading bicycle. Again, a bushing may be provided so as to permit rotational movement of the connecting device about the seat post.

BRIEF DESCRIPTION OF THE DRAWINGS

Having thus generally described the invention, reference will be made to the accompanying drawings illustrating an embodiment thereof, in which:

FIG. 1 is a side elevational view of a coupling assembly according to the present invention, in contracted (non-operating) configuration;

FIG. 2 is a top plan view thereof, in contracted configuration;

FIG. 3 is a side elevational view of the left hand portion of the coupling assembly of FIG. 1 showing the longitudinal adjustment thereof, in extended (operating) configuration;

FIG. 4 is a perspective view of the connecting device located at the left hand side of FIGS. 1, 2 and 3;

FIG. 5 is a bottom plan view of one of the jaws of the connecting device of FIG. 4;

FIG. 6 is a sectional view taken along the line 6—6 of FIG. 5;

FIG. 7 is a side elevational view of the connecting device illustrated in FIG. 4;

FIG. 8 is a side elevational view showing attachment of the coupling assembly to a leading bicycle, in contracted configuration;

FIG. 9 is a side elevational view showing the use of the coupling assembly for coupling a leading and trailing bicycle together;

FIG. 10 is a view similar to FIG. 9 illustrating the coupling device connecting two bicycles together when one of the bicycles is of a smaller size; and FIG. 11 is a side elevational view of the coupling assembly.

DESCRIPTION OF THE PREFERRED EMBODIMENTS

Referring to the drawings in greater detail and by reference characters thereto, there is illustrated a coupling assembly suitable for interconnecting a leading bicycle and a trailing bicycle and which coupling assembly is generally designated by reference numeral 10.

Coupling assembly 10 includes a first connecting device generally designated by reference numeral 12, a second coupling device generally designated by reference numeral 14 and an interconnecting portion generally designated by reference numeral 16.

First connecting device 12 is illustrated in greater detail in FIGS. 4 to 7 and reference will now be made thereto. First connecting device 12 has a base portion 20 from which there extends rearwardly a pair of spaced apart parallel lugs 22. Each lug 22 has an aperture therein to receive a bolt 24 and securing nut 26 for reasons which will become apparent hereinbelow.

A pair of jaws 28, 28' are provided for purposes of attachment to a trailing bicycle. Jaws 28, 28' are substantially identical and thus, only one 28 will be described herein, with similar primed reference characters referring to the other 28'.

Jaw 28, 28' has a C-shaped segment 30, 30', one end of C-shaped segment 30, 30' being hingedly connected to an end of base 20 by means of pin 32, 32'. An opposite end of C-shaped segment 30, 30' then extends inwardly to form a gripping segment which is generally designated by reference numeral 34, 34'. Gripping segment 34, 34' has a V-shaped recess 35, 35' defined by walls 38 and 40. Preferably, walls 38 and 40 form an angle of between 128 degrees–132 degrees. Mounted on the outer surface of walls 38 and 40 is a bushing 36, 36', which allow for free pivoting of the first connecting device 12 secured by means of screws 37, 37' about a shaft of a trailing bicycle handle bar.

As aforementioned, jaw 28' is of a similar configuration and gripping segments 34, 34' are arranged such that the V-shaped recesses 35, 35' face each other and form an encircling portion designed to receive the mounting shaft of a handle bar as will be discussed hereinbelow.

Extending opposite to gripping segments 34, 34' are ears 42, 42' which are secured together by means of a fastener 44 and a nut 46. A quick release handle 48 is provided to tighten and/or loosen the attachment as desired.

At the other end of coupling assembly 10, second connecting device 14 is designed to grip the seat post of a bicycle and, as shown in FIG. 2, comprises a first jaw 56 having a V-shaped recess 58 formed therein. A bushing 60 is mounted on V-shaped recess 58 such that the gripping segments are free to pivot about the shaft of the seat post—i.e. they do not firmly grip the shaft of the leading bicycle seat post, while a second jaw 62 is pivotably secured to first jaw 56 by means of pivot pin 64. A similar V-shaped recess 66 having bushing 68 is formed on second jaw 62, the arrangement being such that second jaw 62 may be pivoted into and out of a locking position with respect to first jaw 56. A fastening device 70 with nut 72 and actuator handle 74 is provided for securing jaws 56 and 62 together.

Interconnecting portion 16 includes, in the illustrated embodiment, a first shaft 78, a second shaft 80 and a third shaft 82, all arranged in a telescoping arrangement. Apertures 84 are provided to lock shafts 78, 80 and 82 in a desired position with respect to each other to achieve a desired length. Locking members 86 are insertable through apertures 84 when the proper length has been achieved.

Interconnecting portion 16 also includes a flexible portion comprised of, in the illustrated embodiment, helical spring 90. Helical spring 90 may be attached to shaft 82 by any suitable means such as being screw threadably engaged therewith. Spring 90 permits movement in all planes and furthermore preferably provides for a rotational (flexion) and a torsional capabilities around its longitudinal axis. It is, however, sized to be substantially inextensible in the longitudinal direction. Other arrangements such as a flexible thermoplastic or Rubber material could also be employed.

A connecting segment 92 extends from the other end of spring 90 to connecting device 14. In this respect, it will be noted that connecting segment 92 lies in a plane different than the generally horizontal plane of coupling assembly 10.

In use, connecting device 12 is connected to the handle bar shaft 94 of a trailing bicycle T while second connecting device 14 is connected to seat post 96 of leading bicycle L. As shown in FIGS. 10 and 11, the device, due to helical spring 90, can be used for bicycles of different sizes. Also, the adjustability of telescopic shafts 78, 80 and 84 allows for adjustment of the length of coupling assembly 10.

It will be noted that gripping segments 34, 34' lie in a plane which is angled with respect to the plane of C-shaped segments 30 and the overall plane of the coupling assembly 10. This provides for the necessary adjustment of the angle for fitting about shaft 94. Similarly, connecting segment 92 permits the proper connection about seat post 96 of leading bicycle L while still providing the necessary clearance for accessories on the bicycle and the like.

It will be understood that the above described embodiments are for purposes of illustration only and that changes and modifications may be made thereto without departing from the spirit and scope of the invention.

I claim:

1. A coupling device comprising an elongated assembly, said elongated assembly having:
   a first connecting device located at one end of said elongated assembly for connection to a trailing bicycle;
   a second connecting device located at an opposite end thereof for connection to a leading bicycle;
   an interconnecting portion extending between said first connecting device and said second connecting device;
   said interconnecting portion comprising a rigid segment and a flexible segment, said flexible segment permitting movement in all planes while being substantially inextensible in the longitudinal axis; and
   said rigid segment being longitudinally adjustable in fixed increments to vary the length of the coupling device.

2. The coupling device of claim 1 wherein said first connecting device includes first and second jaw members pivotably connected to a base, said first and second jaw members each having a gripping segment, said gripping segments together defining an encircling portion designed to encircle a shaft of a bicycle handle bar.

3. The coupling device of claim 2 wherein said encircling portion lies in a plane angled with respect to a generally horizontal plane of said coupling device.

4. The coupling device of claim 3 further including quick release securing means associated with each of said first and second jaw members for securing said first and second jaw members together.

5. The coupling device of claim 2 further including a bushing on each of said gripping segments to allow for free pivoting of said first connecting device about said shaft of said trailing bicycle handle bar.

6. The coupling device of claim 1 wherein said rigid segment is longitudinally adjustable by means of a plurality of telescopic members.

7. The coupling device of claim 1 wherein said flexible segment comprises a helical spring to thereby permit said movement in all planes while being substantially inextensible in the longitudinal axis.

8. In combination, a leading bicycle and a trailing bicycle and a coupling device interconnecting said leading bicycle and said trailing bicycle, said coupling device comprising an elongated assembly, said elongated assembly having:
   a first connecting device located at one end of said elongated assembly connected to said trailing bicycle;
   a second connecting device located at an opposite end thereof connected to said leading bicycle;
   an interconnecting portion extending between said first connecting device and said second connecting device;
   said interconnecting portion comprising a rigid segment and a flexible segment, said flexible segment permitting movement in all planes while being substantially inextensible in the longitudinal axis; and
   said rigid segment being longitudinally adjustable in fixed increments to vary the length of the coupling device;
   said first connecting device extending about a downwardly extending shaft of a handle bar of said trailing bicycle, said second connecting device extending about and encircling a seat post of said leading bicycle.

9. The coupling device of claim 1 wherein said flexible segment further allowing for torsional movement around the longitudinal axis.

10. The coupling device of claim 9 wherein said flexible segment comprises a helical spring to thereby permit said movement in all planes while being substantially inextensible in the longitudinal axis.

11. The coupling device of claim 1 wherein said second connecting device includes a first member integral to the base and a second jaw member pivotably connected to said first jaw member, said first and second jaw members each having a gripping segment, said gripping segments together defining an encircling portion designed to encircle a shaft of the bicycle seat post.

12. The coupling device of claim 11 wherein said encircling portion lies in a plane angled with respect to a generally horizontal plane of said coupling device.

13. The coupling device of claim 12 further including quick release securing means associated with each of said first and second jaw members for securing said first and second jaw members together.

14. The coupling device of claim 11 further including a bushing on each of said gripping segments to allow for free pivoting of said second connecting device about said shaft of said leading bicycle seat post.

15. The coupling device of claim 1 wherein said first and second connecting devices are pivotally connected to said trailing and leading bicycles respectively.

* * * * *